May 23, 1961 G. B. McFARLAND 2,985,464
MAILING INSTRUMENT
Filed March 10, 1958 3 Sheets-Sheet 3
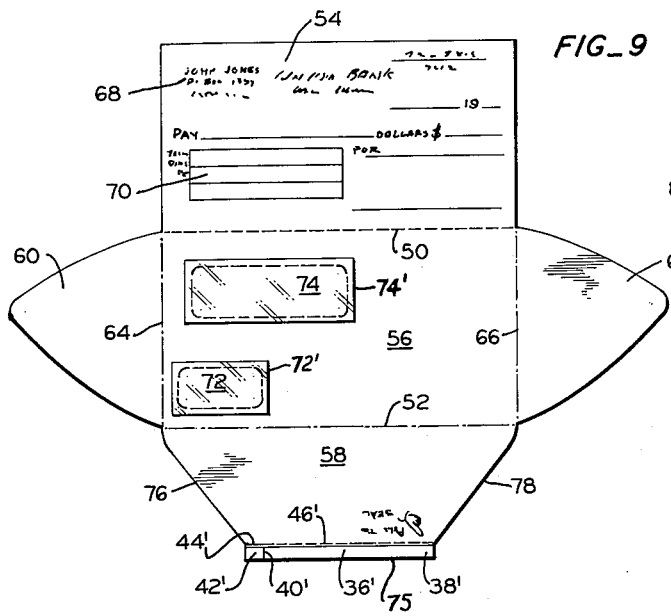
FIG_9
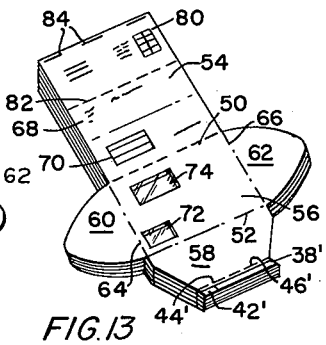
FIG.13
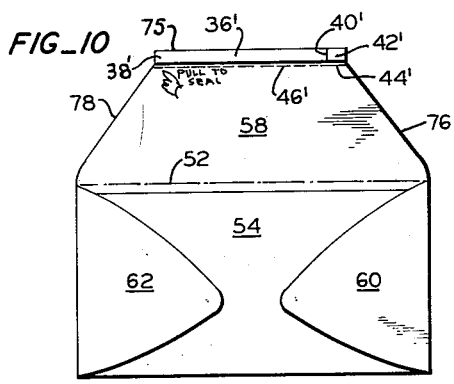
FIG_10
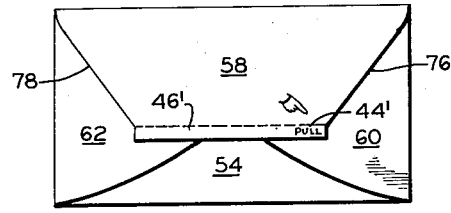
FIG_11
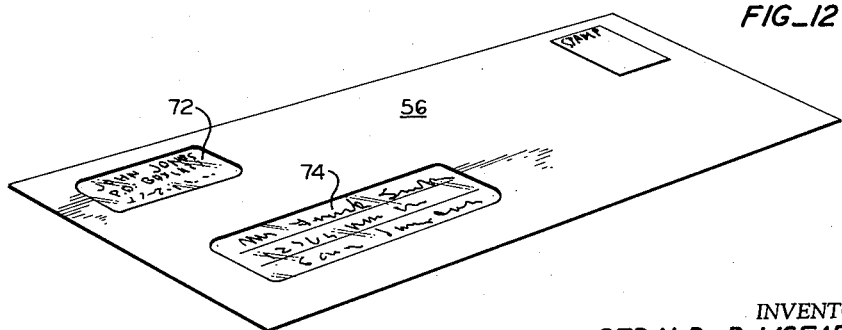
FIG_12
INVENTOR.
GERALD B. McFARLAND
BY
Fryer & Johnson
ATTORNEYS United States Patent Office 2,985,464
Patented May 23, 1961

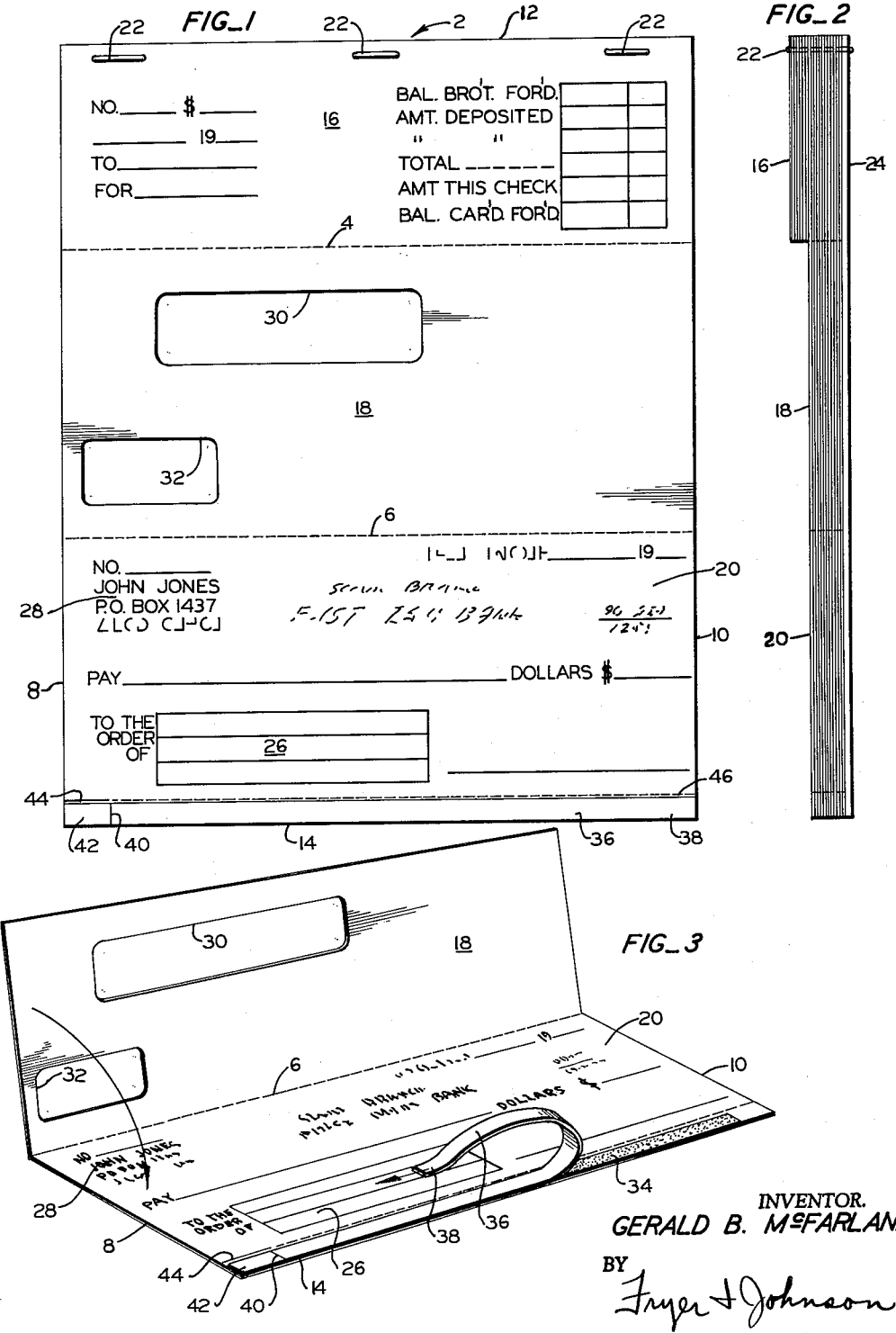

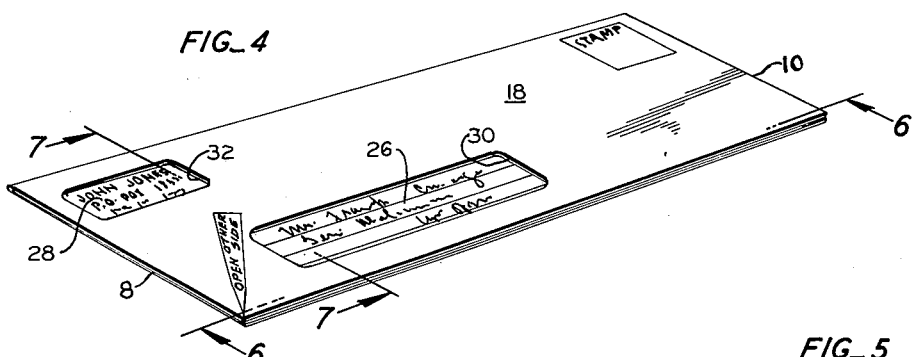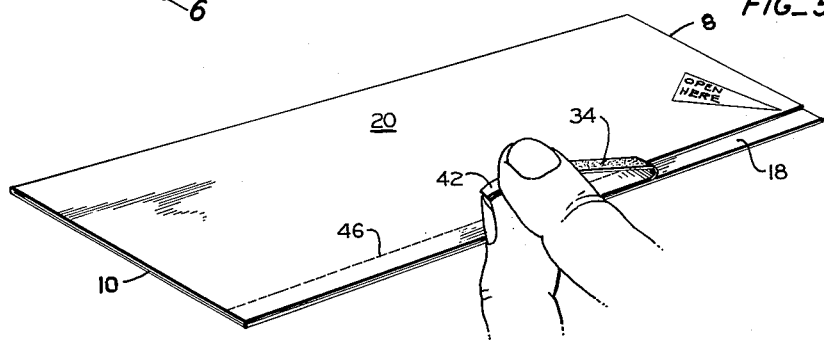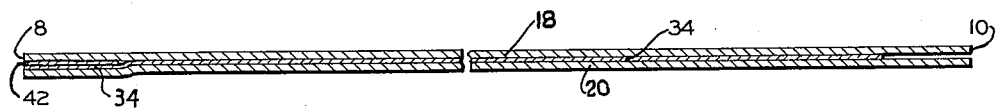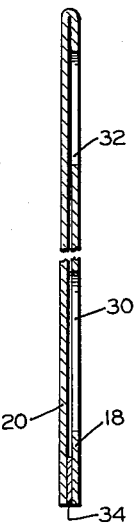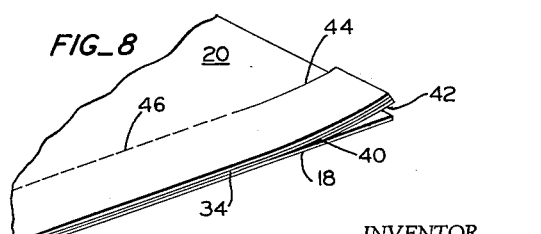

2,985,464
MAILING INSTRUMENT
Gerald B. McFarland, McFarland, Calif., assignor to M. B. McFarland & Sons, McFarland, Calif., a partnership
Filed Mar. 10, 1958, Ser. No. 720,383
5 Claims. (Cl. 283—58)

This invention relates generally to sealable mailing devices and more particularly to mailing instruments made from paper or other suitable materials comprising cooperable sections adapted to be folded and sealed together for mailing.

As is well known, bank checking accounts are in widespread use today and checks commonly are used for payment of accounts due by both business concerns and individuals, such as home owners or housewives. Because bills and accounts due generally are sent out by most creditors at a particular time, such as the first day of each month, a particular business man or home owner frequently is obliged to write a large number of checks to effect payment of such bills. Frequently, such payment is effected by inserting a completed or filled in check ready for negotiation into an envelope and addressing the envelope to the person or business to receive payment of the amount due. As a result, it is necessary for the person paying the bill not only to complete the check for negotiation but also to address a separate envelope in which the check may be mailed to the creditor for payment.

The present invention relates to mailing instruments, such as checks which are ready for negotiation, which require no separate envelope for mailing whereby time and the expense of a separate envelope is saved by the person drawing the check.

The objects of the present invention, among others, include the provision of a mailing instrument of the check type which may be filled in for negotiation and may be mailed without requiring a separate envelope; the provision of securing means on the instrument for maintaining the instrument in sealed condition for mailing; the provision of opening means for such a sealed instrument; the provision of an instrument having a checking account balance stub detachably connected thereto to facilitate record keeping; and the provision of a mailing instrument which may be put up in pad form to present a quantity of such instruments ready for use at any time.

Other and more specific objects of this invention will become apparent from the following description and reference is directed to the accompanying drawings which illustrate several desirable embodiments of the invention.

In the drawings:

Fig. 1 is a plan view of a mailing instrument of the present invention;

Fig. 2 is a side elevational view of a pad of instruments showing part of several of the instruments removed from the pad leaving their associated stubs secured to the pad;

Fig. 3 is an isometric view of an instrument being folded for sealing and mailing;

Fig. 4 is an isometric view of an instrument folded and sealed for mailing;

Fig. 5 is an isometric view of an instrument being opened after receipt following mailing;

Fig. 6 is a sectional view on an enlarged scale taken in the plane of line 6—6 of Fig. 4 illustrating details of the securing means for the instrument;

Fig. 7 is a sectional view taken in the plane of line 7—7 of Fig. 4 illustrating details of the instrument sealed and ready for mailing;

Fig. 8 is an isometric view on an enlarged scale of a sealed instrument illustrating the opening pull tab means associated therewith;

Fig. 9 is a plan view of a modified type of mailing instrument;

Fig. 10 is a plan view of the instrument modification folded preparatory to sealing for mailing;

Fig. 11 is a view of the instrument completely folded and sealed for mailing;

Fig. 12 is an isometric view of the front face of the instrument of Fig. 11 sealed and ready for mailing.

Fig. 13 is an isometric view on a reduced scale of a series of the modified mailing instruments, secured together in pad form, each of which includes a check stub detachably connected therewith.

Referring first to Fig. 1, the mailing instrument 2 of this invention comprises a substantially flat sheet of paper, desirably of the safety type commonly used for the printing of checks. Desirably, such paper sheet is divided into three sections or portions by transversely extending fold lines 4 and 6 which extend between opposite side edges 8 and 10 of the sheet. Lines 4 and 6 are substantially parallel to each other and to the upper edge 12 and bottom edge 14 of the sheet. Fold lines 4 and 6 desirably are perforated, or otherwise weakened, to facilitate tearing of the sheet along such lines for a purpose to be described hereinafter.

The sheet sections provided by perforated fold lines 4 and 6 include a checking account balance stub 16 hingedly connected along line 4 to one margin of an intermediate sheet section 18 which provides a cover for a partially preprinted check body structure or check section 20 hingedly connected to another margin of the intermediate cover structure or section 18 along fold line 6. Desirably, check section 20 and cover section 18 are of substantially the same rectangular configuration and size to present a neat and compact mailing instrument when folded to overlie each other.

As shown in Fig. 1, check stub 16 desirably is preprinted with typical check book information so that the user of the instrument is able to maintain an accurate record of the amount of money in his checking account in the conventional manner. While check stub 16 desirably is hingedly connected along the upper edge of intermediate cover section 18, such check stub also may be detachably connected to the instrument at some other location, for example along one of the side edges 8 or 10 of the sheet. Furthermore, if desired, sections 18 and 20 could be formed separately from the check stub and merely used in conjunction therewith for record keeping.

That portion of the instrument to be mailed comprises only sections 18 and 20. To effect such mailing check stub 16 is separated along perforated fold line 4 from the remainder of the sheet. When the check stub and remainder of the instrument are separated, cover section 18 may be folded over into face to face engagement with check section 20 in the manner illustrated in Fig. 3 and may be secured thereto in any suitable manner for mailing as a unit.

As shown in Fig. 2, a plurality of mailing instruments, each of which includes a check stub 16, may be united or secured together in pad form. Any suitable means may be provided for maintaining a plurality of instruments together, such as staples 22 or an appropriate adhesive or the like. Any desired number of instruments may be connected together but twenty-five sheets have been fund to produce a pad of suitable size. When the instruments are connected in such pad form, a backing member in the form of a paperboard sheet 24 or the like desirably is connected therewith to impart sturdiness to the pad to protect the instruments during handling.

Check section 20, as shown in Figs. 1 and 3, desirably is at least partially pre-printed in a conventional manner to include the name of the bank on which the check is drawn, and to provide appropriate spaces for the insertion of the date, the amount to be paid, the check drawer's signature and the like. Desirably check body section 20 also is provided with a predetermined area 26 including a printed and lined portion into which the name and address of the check payee may be inserted. Desirably, another predetermined area 28 is provided on check section 20 into which the name and address of the check drawer is to be inserted, either by pre-printing or by hand writing when the check is filled in for negotiation.

As illustrated in the drawings, predetermined areas 26 and 28 are located on check section 20 in the positions generally occupied by the return address of the sender of a letter and the name and address of the addressee to whom a letter is being sent; that is, the check drawer's name and address are inserted in the upper left corner of section 20 while the name and address of the check payee are inserted adjacent the bottom of section 20.

Intermediate cover section 18 desirably is apertured and provided windows or openings 30 and 32. These openings are located in cover section 18 so that they are alignable with predetermined areas 26 and 28 when cover section 18 is folded over into face to face engagement with check section 20. As a result, the names and addresses inserted in the predetermined areas are visible through the openings 30 and 32 of the cover section. In this manner, a pre-printed check section, which has been filled in completely for negotiation by inserting the date, the amount to be paid, the name and address of the payee, and the signature of the drawer, may be adapted for mailing without requiring the bothersome task of addressing a separate envelope and inserting the completed check into such envelope. With the mailing instrument of this invention the name and address of the check payee need only be written once and the check is ready for mailing. The condition of the mailing instrument with the names and addresses of the drawer-sender and the payee-addressee visible through the openings 30 and 32 is illustrated in Fig. 4.

In the embodiment illustrated, the inner face of cover section 18, as shown in Figs. 1 and 3, is substantially plain but advertisements, messages or other matter could be inserted on such face if desired. As shown in Fig. 4, desirably the outer face of cover section 18 is provided with a printed area for the location of a stamp. Appropriate information relating to the proper manner for opening the instrument by the recipient of the instrument after mailing also desirably is provided on both the address side and back side of the sealed instrument.

Although two address openings have been provided in check section 20 in the illustrated embodiment, if desired, opening 32 could be omitted and the return address of the drawer-sender could be inserted in any convenient location on the sealed instrument. The illustrated embodiment is preferable, however.

From the foregoing, it should be understood that the mailing instrument of this invention precludes the necessity for a person utilizing a checking account from writing the payee's name and address both on the check and on a separate mailing envelope. When a large number of checks are to be mailed at the same time, the savings in time, expense and effort by utilizing this invention are considerable.

Any suitable means may be utilized for maintaining cover section 18 in face to face engagement with check body section 20 during mailing. Desirably securing means is provided on one of such sections for engagement with the other section and preferably such securing means takes the form of a suitable adhesive. However, if desired, securing means other than adhesive, such as staples or the like, could be utilized to maintain the sections in face to face engagement.

One form of adhesive securing means which has been found suitable and desirable for use with the mailing instrument of this invention is of the type generally shown in applicant's copending application for "Flap Closure and Opening Means for Containers or the Like," Serial No. 716,724, filed February 21, 1958, now Patent No. 2,962,205, issued November 29, 1960.

The securing means illustrated includes a length of flat tape 34 (see Figs. 3 and 6) having a layer of pressure sensitive adhesive of any suitable type positioned on each of the opposite sides thereof thereby providing a double-coated tape. Such tape may be secured to either section 18 or 20 of the instrument but in the embodiment illustrated the tape is adhesively secured to check section 20 adjacent the lower edge 14 thereof. Desirably tape 34 terminates inwardly a small distance from side edge 10 of check section 20 but extends to a location substantially flush with opposite side edge 8 of the check section. A protective strip 36 of paper or other suitable material is positioned on the outer surface of adhesive tape 34 and is adhered to the adhesive layer on such outer surface.

Protective strip 36 precludes check section 20 from becoming adhesively secured to another surface until the protective strip has been removed therefrom to expose the outer adhesive layer of the tape. As a result, a plurality of mailing instruments of this invention may be secured together in pad form as shown in Fig. 2 without the separate instruments becoming accidentally secured together regardless of climatic conditions or the like. As shown in Fig. 1, protective strip 36 desirably extends the full distance between opposite side edges 8 and 10 of check section 20. Because tape 34 terminates inwardly of side edge 10, a portion of such protective strip is not adhered to the tape, thereby providing a free pull tab 38 adjacent edge 10 which may be easily grasped to effect removal of the protective strip from engagement with the tape.

Desirably, the inner adhesive layer of tape 34 which engages check section 20 possesses stronger adhesive characteristics than does the outer adhesive layer engaging protective strip 36. As a result, strip 36 may be removed from the tape without the tape being stripped from check section 20 by accident.

Adjacent its opposite end, protective strip 36 is transversely cut as at 40 thereby dividing the strip into two sections and providing a small protective section or tab 42 engaged with adhesive tape 34. As a result, when protective strip 36 is removed from check section 20 as shown in Fig. 3, the small tab section 42 is not removed but remains in adhesive engagement with the tape 34 for a purpose to be described.

Extending inwardly from side edge 8 of check section 20 is a slit or cut 44 which extends parallel to the inner edge of tape 34 a distance substantially equal to the length of protective tab section 42. Tab section 42 and slit 44 provide instrument opening means in the form of a pull tab effective for opening the mailing instrument after receipt by the payee-addressee.

The condition of the instrument with the protective strip 36 removed and flap 18 folded into adhesively secured engagement with check section 20 is shown in Fig. 6. Protective tab section 42 is interposed between an end of tape 34 and a corner portion of cover flap 18 and precludes the cover flap from becoming adhesively engaged with check section 20 adjacent side edge 8 thereof. An opening pull tab, which is freely accessible for opening the instrument as shown in Fig. 8, is provided and may be grasped to allow the adhesive tape to be torn through check section 20 to strip the tape 34 from engagement with the edge of check section 18 to effect opening of the sealed instrument.

Desirably a line of weakness 46 extends from the inner end of slit 44 in check section 20 to the opposite side edge 10 thereof. Such line of weakness desirably is in the form of perforations and extends substantially parallel to the inner edge of tape 34. Perforated line 46 facilitates tearing of check section 20 to effect a neat and rapid opening of the sealed instrument.

As illustrated in the drawings, adhesive tape 34, protective strip 36 and the respective pull tab means provided thereon terminate within the confines of check section 20. As a result, a compact mailing instrument is provided when cover section 18 is adhesively secured in face to face engagement with check body section 20. No ends or portions of the securing means extend beyond the instrument which may be accidentally engaged when the instrument is run through a cancelling machine or the like by the postal authorities, and as a result, accidental opening of the instrument is precluded.

In the embodiment described, the opposite ends of the mailing instrument are open and unsecured, the instrument being sealed only along mating edges of sections 18 and 20. However, if desired, appropriate securing means in the form of adhesive or the like may be used along the opposite aligned side edges of sections 18 and 20 to seal such side edges during mailing to insure protection of the contents of the instrument and prevent tampering therewith.

Figs. 9 to 12 illustrate a mailing instrument modification which is usable when more protection is desired for the pre-printed check section during mailing than is afforded by the instrument of Figs. 1–8.

As shown in Fig. 9, the modified mailing instrument is divided into a plurality of sections by transverse fold lines 50 and 52 which provide a pre-printed check body structure or check section 54 and a cover structure including an apertured intermediate cover section 56 of the type described previously. Closure means for the ends of the instrument desirably is provided and takes the form of a closure flap 58 hingedly connected to cover section 56 along fold line 52 and protective side cover flaps 60 and 62 hingedly connected to opposite edges of cover section 56 along fold lines 64 and 66 respectively. Cover flaps 60 and 62 extend laterally outwardly from cover section 56.

As in the previously described embodiment, the pre-printed check section 54 is detachably connected to the remainder of the mailing instrument along a line of weakness and in this embodiment fold line 50 takes the form of perforations or the like which facilitate detachment of the check section from the mailing instrument upon receipt by the original payee-addressee.

Desirably check section 54 is provided with predetermined areas 68 and 70 upon which are to be inserted the name and address of the check drawer and the name and address of the check payee, respectively, as described previously. Apertured cover section 56 is provided with a plurality of windows or openings 72 and 74 which are alignable with the predetermined areas 68 and 70 respectively of the check section when such check section is folded over into face to face engagement with the apertured section 56. Desirably sheets of transparent material, such as appropriately sized sheets 72' and 74' of cellophane or the like, are secured to the inner face of cover section 56 to close the opening to protect the check section 54 and the entries inserted thereon.

Closure flap 58 is provided with securing means adjacent its free edge 75 and desirably such securing means extends substantially the full width of such flap between converging side edges 76 and 78 thereof as shown in Figs. 9 and 10. Any suitable securing means may be utilized with the mailing instrument modification illustrated but desirably double coated adhesive tape securing means of the type described previously is suitable. Such adhesive tape securing means is generally the same as that described previously with respect to the embodiment of Figs. 1–8 and similar reference numerals have been employed but primes have been utilized to differentiate the securing means of the two embodiments.

A double coated adhesive tape is secured adjacent free edge 75 of the closure flap 58 and extends substantially the full distance therebetween but terminates inwardly from side edge 78 of flap 58. A removable protective strip 36' having a pull tab 38' at one end covers such double coated adhesive tape and precludes inadvertent sticking of the tape to another surface and thereby preserves the tape in proper condition for sealing.

Protective strip 36' is transversely cut adjacent its opposite end as at 40' thereby providing a small protective tab section 42' which remains engaged with the adhesive tape upon removal of protective strip 36' therefrom. Extending inwardly from side edge 76 in a direction substantially parallel to free edge 75 and the inner edge of the double coated adhesive tape is a slit or cut 44'. Slit 44' cooperates with the protective pull tab section 42' to provide an instrument opening pull tab which may be grasped to effect opening of the instrument in the manner described previously. Desirably a line of weakness 46' extends from the inner end of slit 44' parallel to the inner edge of the adhesive tape to the opposite side edge 78 of the flap 58. The line of weakness insures a neat opening of the mailing instrument when the tape is pulled to tear flap 58 and to strip the tape from the remainder of the instrument. No auxiliary opening tools are required to open the sealed instrument.

The modification described is utilized in the following manner. The drawer-sender fills in check section 54 by inserting thereon the date, the amount payable, the name and address of the payee-addressee and the like and then signs the instrument thereby providing a negotiable check which may be cashed upon receipt by the payee-addressee.

Upon completion of check section 54, the same is folded along line 50 into face to face engagement with apertured section 56. Upon such folding, the names and addresses on check section 54 are visible through the openings 72 and 74 in cover section 56 as shown in Fig. 12. Protective side cover flaps 60 and 62 thereafter are folded over the outer face of check section 54 into the position shown in Fig. 10. Upon removal of the protective strip 36' of the adhesive securing means to expose the adhesive tape lying therebeneath, the cover flap 58 may be folded over into engagement with outer portions of check section 54 and side protective cover flaps 60 and 62, as shown in Fig. 11. Upon applying pressure to closure flap 58 in the area of the adhesive tape, the instrument is sealed and is then ready for mailing. Inadvertent or unauthorized entry into the instrument or accidental damage to the check section contained therein is precluded because the entries on such check section are entirely protected by protective side flaps 60 and 62 and cover flap 58.

This modification of the mailing instrument is desirable in that the ends of the instrument are completely closed as are the openings in the apertured cover section. Because of the disclosed construction unauthorized persons cannot become aware that a check is contained in the instrument and tampering with the instrument by such unauthorized persons is precluded.

As shown in Fig. 12, the predetermined areas of check section 54 are so arranged and aligned with the apertures in the cover section 56 that upon sealing the instrument, the check drawer's name appears in the upper lefthand corner of the front face of the instrument in the position normally utilized for envelope return addresses. Similarly the payee's name and address are visible through the front face of the instrument in the position normally utilized for the name and address of an addressee of a conventional envelope.

It should be understood that if desired checking account balance stubs 80 may be incorporated with each modified mailing instrument of the type shown in Fig. 9 in much the same manner as illustrated with the instrument embodiment of Fig. 1. This construction is illustrated in Fig. 13. Each check stub 80 may be attached to an instrument in any convenient location, such as along a score line 82 which defines one of the edges of check section 54. Also if desired, the modified mailing instrument may be connected in pad form by means of staples 84 or the like whereby a quantity of the instruments will always be available for use.

Although the self-mailing checks described herein are highly suitable for use by home owners for household purposes, such checks also may be used for other business purposes wherein the saving of time and the expense of separate mailing envelopes is desirable.

From the foregoing, it should be seen that the present invention provides mailing instruments of the check type which are easily adapted for mailing and which preclude unnecessary work on the part of a business person, home owner or the like in that separate mailing envelopes are unnecessary. Although the invention has been described with relation to self-mailing checks, other instruments could be provided with the novel features of the described check instrument and the present invention should be interpreted in light of the appended claims.

I claim:

1. A complete mailing instrument of the check type which is mailable without requiring a separate envelope, comprising a single flat foldable sheet of paper or like material which includes check structure to be filled in for negotiation by a check drawer, and cover structure foldable substantially entirely around said check structure to protect the same during mailing of said instrument, said instrument being divided by predetermined series of fold lines into said check structure and said cover structure; said check structure being hingedly connected to said cover structure along a fold line and comprising a check section having predetermined areas located on a front surface thereof when said instrument lies flat and unfolded for receiving the names and addresses of the check payee and drawer; said cover structure comprising a check protecting cover section hingedly connected to said check section along a margin of said cover section defined by said fold line, said cover section having an opening therein through which the name and address of said check payee are visible when said instrument is folded for mailing, a pair of check protecting cover flaps extending laterally from and hingedly connected to said cover section along opposite second and third margins thereof, each of said cover flaps being free of adhesive on its front surface when said instrument lies flat and unfolded, and a closure flap hingedly connected to said cover section along a fourth margin thereof; said check section following insertion of said payee's name and address thereon in one of said predetermined areas and signature by said drawer being foldable over into direct contact with said cover section so that said payee's name and address are aligned with and visible through said cover section opening when said check section is so folded, said cover flaps being foldable over into direct contact with the rear surface of said check section when said check section is so folded to protectively overlie such rear surface without becoming adhesively secured thereto, and said closure flap being foldable over into direct overlying contact with the rear surface of said cover flaps when said cover flaps are so folded, whereby said cover section, said cover flaps and said closure flap substantially entirely surround said check section and protect the same when said instrument is folded for mailing; and adhesive means on said instrument between said closure flap and said cover flaps when said instrument is folded for mailing to maintain said instrument folded until opened by said payee following receipt.

2. The mailing instrument of claim 1 in which said adhesive means comprises a length of dual purpose instrument sealing and opening adhesive tape in combination with said instrument, said tape being coated on each of its opposite faces with a layer of adhesive, said tape extending across and being secured to said closure flap by means of one of such adhesive layers, the other of such adhesive layers being adapted to secure said closure flap to said cover flaps when said instrument is folded for mailing, and a pull tab adjacent an end of said tape which is graspable when said instrument is folded for mailing so that said tape may be pulled through said closure flap to free the same from said cover flaps, whereby said instrument may be opened and the need for separate opening tools to effect such opening is precluded.

3. The mailing instrument of claim 1, in which said instrument further comprises a check stub detachably connected to said check section along a predetermined line of weakness, said check stub extending in substantially coplanar relationship with said check section, said check section and said cover structure being separable as a unit from said check stub preparatory to folding said instrument for mailing with said cover structure folded around said check section, said check stub being retainable by said check drawer for record purposes.

4. The mailing instrument of claim 3 wherein said instrument is separably connected with a plurality of similar instruments to provide a check pad, each instrument of said pad being flat and unfolded with the check stub, check section, cover section, cover flaps and closure flap thereof being aligned with and overlying the respective stubs, sections and flaps of the instruments lying therebeneath, whereby a flat, neat and compact check pad is provided.

5. A complete mailing instrument of the check type which is mailable without requiring a separate envelope, comprising a single flat foldable sheet of paper or like material which includes check structure to be filled in for negotiation by a check drawer, and cover structure foldable substantially entirely around said check structure to protect the same during mailing of said instrument, said instrument being divided by predetermined series of fold lines into said check structure and said cover structure; said check structure being hingedly and detachably connected to said cover structure along a line of weakness which defines a fold line, said check structure comprising a check section having predetermined areas located on a front surface thereof when said instrument lies flat and unfolded for receiving the names and addresses of the check payee and drawer; said cover structure comprising a check protecting cover section hingedly connected to said check section along a margin of said cover section defined by said line of weakness, said cover section having spaced openings therein through which the names and addresses of said check payee and drawer are visible when said instrument is folded for mailing, a pair of check protecting cover flaps extending laterally from and hingedly connected to said cover section along opposite second and third margins thereof, each of said cover flaps being free of adhesive on its front surface when said instrument lies flat and unfolded, and a closure flap hingedly connected to said cover section along a fourth margin thereof; said check section following insertion of said payee's name and address thereon in one of said predetermined areas and signature by said drawer being foldable over into direct contact with said cover section so that said payee's and said drawer's names and addresses are aligned with and visible through said cover section openings when said check section is so folded, said cover flaps being foldable over into direct contact with the rear surface of said check section when said check section is so folded to protectively overlie such rear surface without becoming adhesively secured thereto, and said closure flap being foldable over into direct overlying contact with the rear surfaces of said cover flaps when said cover flaps are so folded, whereby said cover section, said cover flaps and said closure flap substantially entirely surround said check section and protect the same when said instrument is folded for mailing; and dual purpose adhesive means on said closure flap of said cover structure which is engageable with said cover flaps when said instrument is folded for mailing to adhesively maintain said instrument folded until opened by said payee following receipt, said dual purpose means including a graspable instrument opening tape extending across said closure flap for separating said closure flap from said cover flaps, whereby said instrument may be opened without requiring separate opening tools so that damage to said check section during opening is obviated.

References Cited in the file of this patent

UNITED STATES PATENTS

| | | |
|---|---|---|
| 1,373,512 | Kuhhorn | Apr. 5, 1921 |
| 1,424,837 | Lover | Aug. 8, 1922 |
| 1,708,574 | Hazen | Apr. 9, 1929 |
| 1,946,751 | McCarthy | Feb. 13, 1934 |
| 2,191,704 | Bennett | Feb. 27, 1940 |
| 2,310,371 | Lines et al. | Feb. 9, 1943 |
| 2,689,594 | Wendt | Sept. 21, 1954 |
| 2,831,707 | James et al. | Apr. 22, 1958 |
| 2,887,326 | Kramer | May 19, 1959 |

FOREIGN PATENTS

| | | |
|---|---|---|
| 510,989 | Great Britain | Aug. 11, 1939 |